United States Patent
Ryan (10) Patent No.: US 8,142,291 B2
(45) Date of Patent: Mar. 27, 2012

(54) CONTROL OF RECONFIGURABLE GAMING MACHINES

(75) Inventor: Chad A. Ryan, Henderson, NV (US)

(73) Assignee: WMS Gaming, Inc., Waukegan, IL (US)

( * ) Notice: Subject to any disclaimer, the term of this patent is extended or adjusted under 35 U.S.C. 154(b) by 294 days.

(21) Appl. No.: 12/445,036

(22) PCT Filed: Oct. 2, 2007

(86) PCT No.: PCT/US2007/021153
§ 371 (c)(1),
(2), (4) Date: Apr. 9, 2009

(87) PCT Pub. No.: WO2008/048419
PCT Pub. Date: Apr. 24, 2008

(65) Prior Publication Data
US 2010/0022299 A1    Jan. 28, 2010

Related U.S. Application Data (60) Provisional application No. 60/852,792, filed on Oct. 18, 2006.

(51) Int. Cl.
*G06F 17/00* (2006.01)
(52) U.S. Cl. ............. 463/43; 463/42; 345/557; 711/3; 711/123; 711/125; 711/126; 715/229; 717/122; 717/170
(58) Field of Classification Search ......... 463/2–8, 463/23, 30–32, 34, 37, 42–45, 50; 273/108.1, 273/108.3, 108.4, 118 A, 119 A, 122 A, 123 A, 273/125 A, 126 A, 138.2, 141 A, 142 JB, 273/273, 317.1, 317.3, 317.4, 317.5, 317.6; 345/156–158, 167, 473–474, 557, 664, 679; 711/3, 123, 125–126, 129–132, 135, 138–140, 711/144; 715/229, 856, FOR. 221; 717/122, 717/170; *G06F 17/00*
See application file for complete search history.

(56) References Cited

U.S. PATENT DOCUMENTS

| | | | | |
|---|---|---|---|---|
| 5,619,716 | A | * | 4/1997 | Nonaka et al. ............... 717/167 |
| 5,762,552 | A | * | 6/1998 | Vuong et al. .................. 463/25 |
| 6,006,034 | A | * | 12/1999 | Heath et al. ................. 717/170 |

(Continued)

FOREIGN PATENT DOCUMENTS

EP    1363252 A2    11/2003

(Continued)

OTHER PUBLICATIONS

Written Opinion corresponding to co-pending International Patent Application Serial No. PCT/US2007/021153, United States Patent Office, dated Apr. 10, 2008, 6 pages.

(Continued)

*Primary Examiner* — Arthur O. Hall
(74) *Attorney, Agent, or Firm* — Nixon Peabody LLP (57) ABSTRACT

A gaming machine that permits wagering on games includes an input/output module associated with a microprocessing unit and is adapted to download schedules from a server of gaming actions to be taken by the gaming machine. Memory in the gaming machine stores the schedules. The memory also stores a backup schedule of gaming actions to be taken. A microprocessing unit determines whether one of the schedules or the backup schedule will be implemented. The microprocessing unit controls the performance of the gaming actions defined by the schedule being implemented.

27 Claims, 4 Drawing Sheets

U.S. PATENT DOCUMENTS

| | | | |
|---|---|---|---|
| 6,012,100 A | 1/2000 | Frailong et al. | |
| 6,183,367 B1* | 2/2001 | Kaji et al. | 463/42 |
| 6,488,585 B1* | 12/2002 | Wells et al. | 463/43 |
| 6,575,835 B1* | 6/2003 | Mishina et al. | 463/42 |
| 6,645,077 B2* | 11/2003 | Rowe | 463/42 |
| 6,749,510 B2* | 6/2004 | Giobbi | 463/42 |
| 6,884,173 B2* | 4/2005 | Gauselmann | 463/42 |
| 7,111,100 B2* | 9/2006 | Ellerbrock | 710/300 |
| 7,758,428 B2* | 7/2010 | Mattice et al. | 463/46 |
| 7,921,302 B2* | 4/2011 | Gatto et al. | 713/191 |
| 7,951,008 B2* | 5/2011 | Wolf et al. | 463/43 |
| 7,972,214 B2* | 7/2011 | Kinsley et al. | 463/42 |
| 8,033,913 B2* | 10/2011 | Cockerille et al. | 463/29 |
| 2003/0224858 A1 | 12/2003 | Yoseloff et al. | |
| 2004/0015608 A1 | 1/2004 | Ellis et al. | |
| 2004/0048668 A1* | 3/2004 | Brosnan | 463/42 |
| 2005/0054431 A1 | 3/2005 | Walker et al. | |
| 2005/0120040 A1* | 6/2005 | Williams et al. | 707/102 |
| 2005/0153778 A1* | 7/2005 | Nelson et al. | 463/42 |
| 2005/0192099 A1* | 9/2005 | Nguyen et al. | 463/42 |
| 2007/0004506 A1* | 1/2007 | Kinsley et al. | 463/29 |
| 2007/0026935 A1* | 2/2007 | Wolf et al. | 463/25 |
| 2007/0105628 A1* | 5/2007 | Arbogast et al. | 463/42 |
| 2008/0080477 A1* | 4/2008 | Block et al. | 370/351 |
| 2008/0200256 A1* | 8/2008 | Gagner et al. | 463/42 |
| 2008/0200258 A1* | 8/2008 | Swarna | 463/42 |
| 2008/0200259 A1* | 8/2008 | Deng | 463/42 |
| 2009/0156313 A1* | 6/2009 | Blackburn et al. | 463/42 |
| 2009/0181764 A1* | 7/2009 | Dasgupta | 463/25 |
| 2011/0004941 A1* | 1/2011 | Mendez et al. | 726/26 |

FOREIGN PATENT DOCUMENTS

| | | |
|---|---|---|
| WO | WO 2006/039557 | 4/2006 |

OTHER PUBLICATIONS

International Search Report corresponding to co-pending International Patent Application Serial No. PCT/US2007/021153, United States Patent Office, dated Apr. 10, 2008, 4 pages.

* cited by examiner

CONTROL OF RECONFIGURABLE GAMING MACHINES

CLAIM OF PRIORITY AND CROSS-REFERENCE TO RELATED APPLICATIONS

This application is a U.S. National Phase of International Application No. PCT/US2007/021153, filed Oct. 2, 2007, from which priority is claimed and which itself claims the benefit of and priority to U.S. Provisional Application No. 60/852,792, filed on Oct. 18, 2006, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines that support wagering on wagering games, and more particularly to controlling schedules and programs executed on reconfigurable gaming machines.

BACKGROUND OF THE INVENTION

Gaming machines, such as slot machines and video poker machines, have been a cornerstone of the gaming industry for several years. Different players, changing popularity of types of games, geographic location of a gaming machine on a casino floor, range of amounts that can be wagered, time of day and day of the week may cause players to be attracted to different types of gaming machines. Casino operators consequently monitor the amount of play of different types and wagering limits of gaming machines and manage the availability of different games to maximize profitability to the operator. Therefore, there is a continuing need for gaming machine manufacturers to provide the operator with increased control of reconfigurable gaming machines.

A centralized gaming controller may have responsibility for reconfiguring remote gaming machines to provide different games and/or variations of games such as the range of the amounts that can be wagered. Such a system permits the operator to change a gaming machine (remote terminal) from one game to another and to vary characteristics of a game. This gives the operator an opportunity to advantageously schedule games and game characteristics being offered to the players to maximize profits. However, a malfunction of the controlling server or communication link between the server and the gaming machines could result in the gaming machines remaining in an undesired mode of operation for longer than anticipated where the server is responsible for implementing changes in gaming machine operation. This could result in lower profits to the operator, e.g. being unable to change a low minimum wager limit used during a weekday to a higher minimum wager limit during a peak interval such as a Saturday evening.

SUMMARY OF THE INVENTION

According to one aspect of the present invention, a gaming machine includes an input/output module associated with a microprocessing unit. The module is adapted to download from a server time-based schedules of gaming actions to be taken by the gaming machine. Memory in the gaming machine stores the time-based schedules. The memory also stores a time-based backup schedule of gaming actions to be taken. A microprocessing unit determines whether one of the time-based schedules or the backup schedule will be implemented. The microprocessing unit controls the performance of the gaming actions defined by the schedule being implemented.

According to another aspect of the invention, a method is implemented for controlling gaming machines that permits wagering on games. The method includes downloading from a server time-based schedules, including a first schedule, of gaming actions to be taken by a first gaming machine. The time-based schedules are stored in memory in the first gaming machine. Also stored in the memory is a time-based backup schedule of gaming actions to be taken by the first gaming machine. A determination is made by the first gaming machine of whether the first schedule or the backup schedule is to be implemented. The first gaming machine implements the gaming actions defined by the selected schedule.

According to yet another aspect of the invention, a computer readable storage medium is encoded with instructions for directing a gaming machine to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
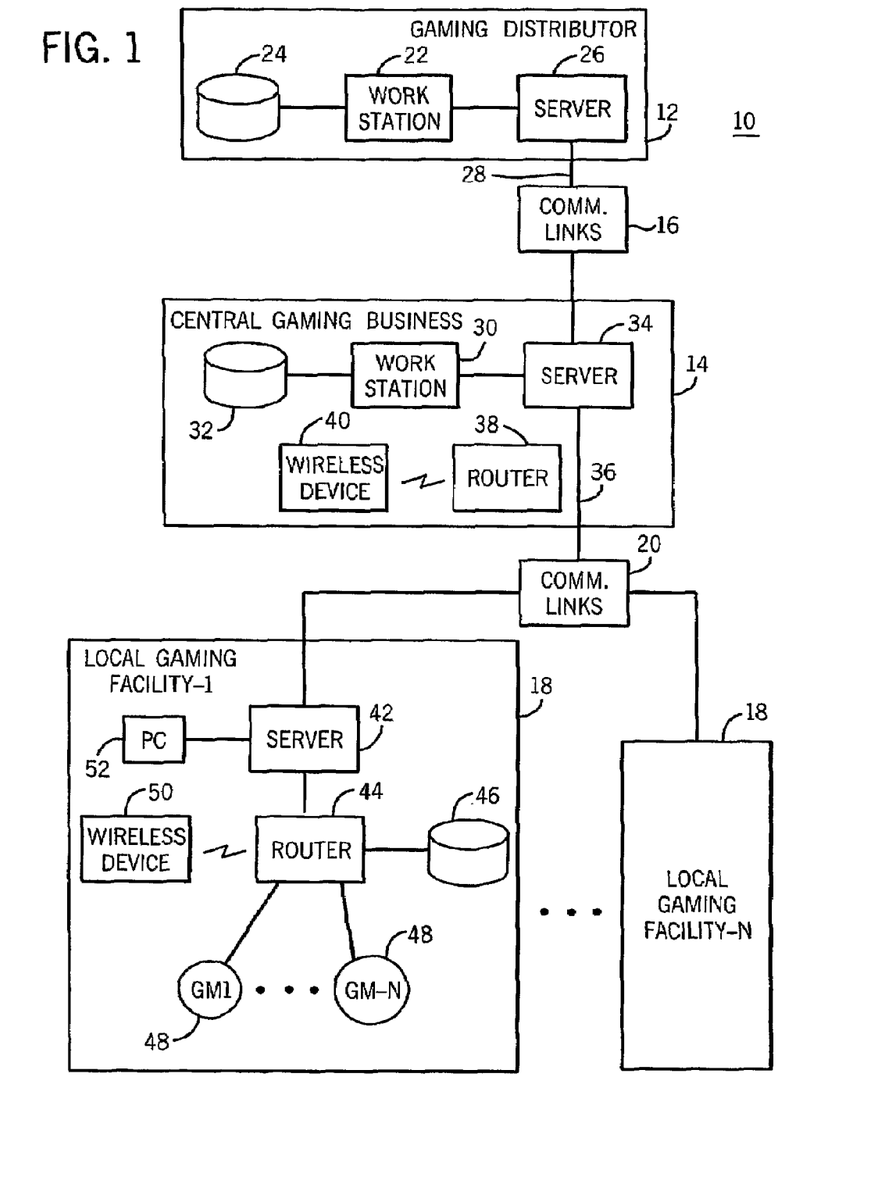
FIG. 1 is a block diagram of an illustrative gaming system embodying the present invention.

Referring to FIG. 1, an exemplary gaming system 10 includes a gaming distributor 12 coupled to a central gaming business 14 by communication links 16. Local gaming facilities 18 are connected by communication links 20 to the central gaming business 14. As used herein, "gaming" refers to the use of various games that support the placing of wagers on the outcome of the games, e.g. a video poker machine. The gaming distributor 12 may consist of the creator or distributor of games and/or gaming machines, e.g. WMS Industries Inc. The central gaming business 14 may consist of centralized operations for a casino or licensed gaming machine operator. The local gaming facilities 18 may consist of geographically separated locations, i.e. different casinos, all owned or controlled by the same central gaming business.

The gaming distributor 12 may include a computer workstation 22 coupled to a nonvolatile memory storage device 24 such as a hard drive. The workstation 22 is also coupled to a server 26 that provides a host for communications over communication channels 28. The workstation 22 may provide a plurality of functions that serve to support the gaming distributor. In accordance with this illustrative embodiment, one function of the workstation 22 is to provide support for the central gaming business 14. For example, the workstation 22 may cause an updated version of a software implemented game stored in device 24 to be downloaded by server 26 to the central gaming business 14 for storage and redistribution to the associated gaming machines at its local gaming facilities.

A central gaming business 14 includes a workstation 30 supported by data storage element 32 and a server 34 that serves as a communication host with the gaming distributor 12 and communication channels 36 coupled to the local gaming facilities 18. The server 34 also supports communication with a router 38 that in turn supports wireless communications with the wireless device 40 which may comprise a laptop computer, personal digital assistant, a data enabled cellular telephone, etc. The wireless device 40 permits users, e.g. administrators and operational personnel of the central gaming business, to receive information generated by workstation 30 as well as information concerning the local gaming facilities 18. It may be utilized to provide data input and instructions to workstation 30.

Each local gaming site 18 includes a server 42 that functions as a host of communications between the subject local gaming facility and the central gaming business 14 and the other local gaming facilities. A router 44 routes communications between the server 42 and other elements including data storage element 46, gaming machines 48 and a wireless communication link with a wireless device 50. The data storage element 46 can be utilized to store control information, gaming machine statistics and gaming programs and/or updates to gaming programs. For example, assume that gaming machines 48 at the subject local gaming facility are to be updated with a new version of a game. This new version may have been downloaded from the gaming distributor 12 by the central gaming business 14 and stored in data storage element 32. At an appropriate time under the control workstation 30, the new version is downloaded and stored by the data storage element 46 of each local gaming facility that contains a gaming machine 48 to receive the new version. At a convenient time such as determined by server 42, the new version stored in data element 46 will be downloaded into the memory of the appropriate gaming machines 48.

Alternatively, a new version of the game can be downloaded directly from the central gaming business 14 to the respective gaming machines 48. The wireless device 50 is similar to the previously described wireless device 40 and preferably supports bidirectional communications. However, in one exemplary embodiment, wireless device 50 is primarily utilized to display status information to gaming system managers concerning the status and utilization of the gaming machines 48 so that the managers are free to roam around the gaming facility. It will be noted that not all of the gaming machines at a particular local gaming facility may be capable of being remotely updated. Those skilled in the art will appreciate that new gaming machines may be designed with sufficient processing and communications ability to be able to be remotely updated and controlled without requiring intermediate processing such as provided by server 42 and router 44. Of course, a gaming system manager may utilize a personal computer 52 connected to server 42, or alternatively to router 44, to display gaming information and provide control instructions for the gaming machines 48 located at the same local gaming facility.

Figure 2:
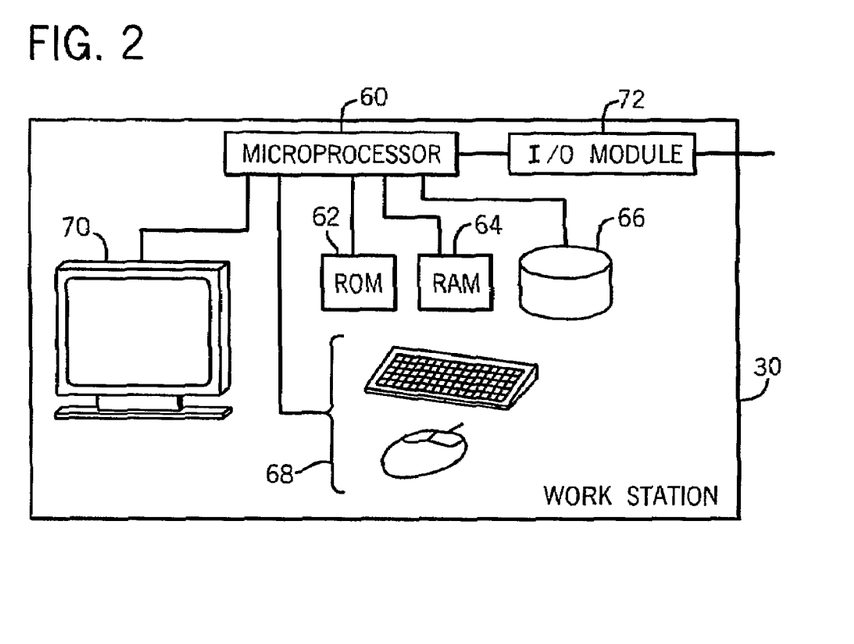
FIG. 2 is a block diagram of an illustrative workstation as shown in FIG. 1.

FIG. 2 shows workstation 30 in more detail. It includes a microprocessor 60 that is supported by read-only memory (ROM) 62, random access memory (RAM) 64 and nonvolatile data storage element 66 such as a hard disk. As will be appreciated by those skilled in the art, ROM 62 stores boot-up control instructions and information for microprocessor 60, and RAM 64 normally stores application control instructions and data obtained from data storage element 66 and/or ROM 62 associated with the implementation and running of an application program. Input devices 68 such as a keyboard and/or mouse and an output device 70 such as a monitor are typically coupled by corresponding support modules (not shown) to microprocessor 60 enabling a user to provide inputs and observe displayed information. An input/output (I/O) module 72 is coupled to microprocessor 60 and enables bidirectional communications between the microprocessor and external devices thereby allowing the module to transmit instructions to and receive requests from the various gaming machines. The microprocessor and required supporting elements forms a microprocessing unit.

Workstation 30, operating under the control of application software, supports a variety of gaming programs and related characteristics as well as the scheduling thereof for use on the remotely reconfigurable gaming machines. This provides a game system manager with increased flexibility and convenience in being able to control and modify the operation of gaming machines.

Figure 3:
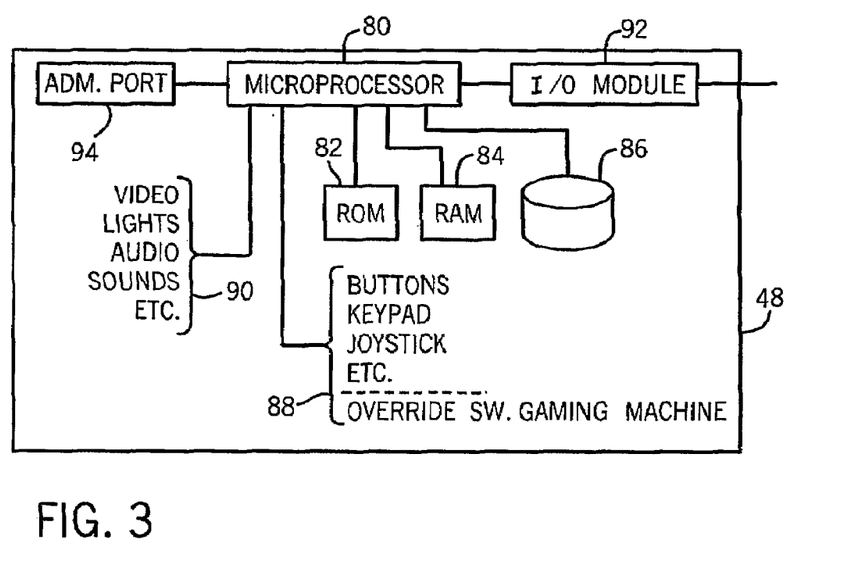
FIG. 3 is a block diagram of an illustrative gaming machine as shown in FIG. 1.

FIG. 3 shows an illustrative gaming machine 48 in more detail. It includes a microprocessor 80 that is supported by ROM 82, RAM 84 and nonvolatile data storage element 86 such as a hard disk. As will be appreciated by those skilled in the art, ROM 82 stores boot-up control instructions and information for microprocessor 80, and RAM 84 normally stores application control instructions and data obtained from data storage element 86 and/or ROM 82 associated with the implementation and running of an application program. Input devices 88 such as buttons, keypad, joystick, etc. and an output devices 90 such as video on a display, lights, audio, sounds, etc. are typically coupled by corresponding support modules (not shown) to microprocessor 80 enabling a user of the gaming machine to provide inputs to the game being played and receive output information about the game. A manual override switch disposed inside the gaming machine for operation by an administrator is another input device. Its function as described in greater detail with regard to FIG. 5. An input/output (I/O) module 92 is coupled to microprocessor 80 and enables bidirectional communications between the microprocessor and external devices, e.g. allowing the module to receive instructions from and transmit requests to the server 42 via router 44. An administration port 94 may interface with a wire or optical cable employing a known protocol, e.g. serial, parallel, or USB, or may consist of a wireless communication module employing a known wireless protocol. The administration port permits an authorized administrator to transmit information including control instructions and game application programs directly to the gaming machine and to receive information including statistics, data, etc. from the gaming machine such as by coupling a computing device, e.g. laptop computer, to the gaming machine via the administration port 94. Alternatively, local software on the gaming machine could support changes to gaming actions while in an administration mode such as by touch screen input. This permits local as well as remote configuration of the gaming machine and provides a system manager with increased flexibility and convenience in being able to locally control and modify gaming action on the gaming machines. "Gaming action" refers to which game is being executed as well as controllable parameters associated with a game, including but not limited to, wagering limit, denomination, available pay tables, game themes, etc. Configuring a game machine by the administration port can be used as a backup updating/control method of the gaming machines where the primary updating/control method is from a server in a client/server model. Or it can be used as the primary method without the use of a server. The microprocessor and required supporting elements forms a microprocessing unit. Various types of hard wired circuitry can be used in the gaming machine for portions that do not require changes in logic.

Figure 4:
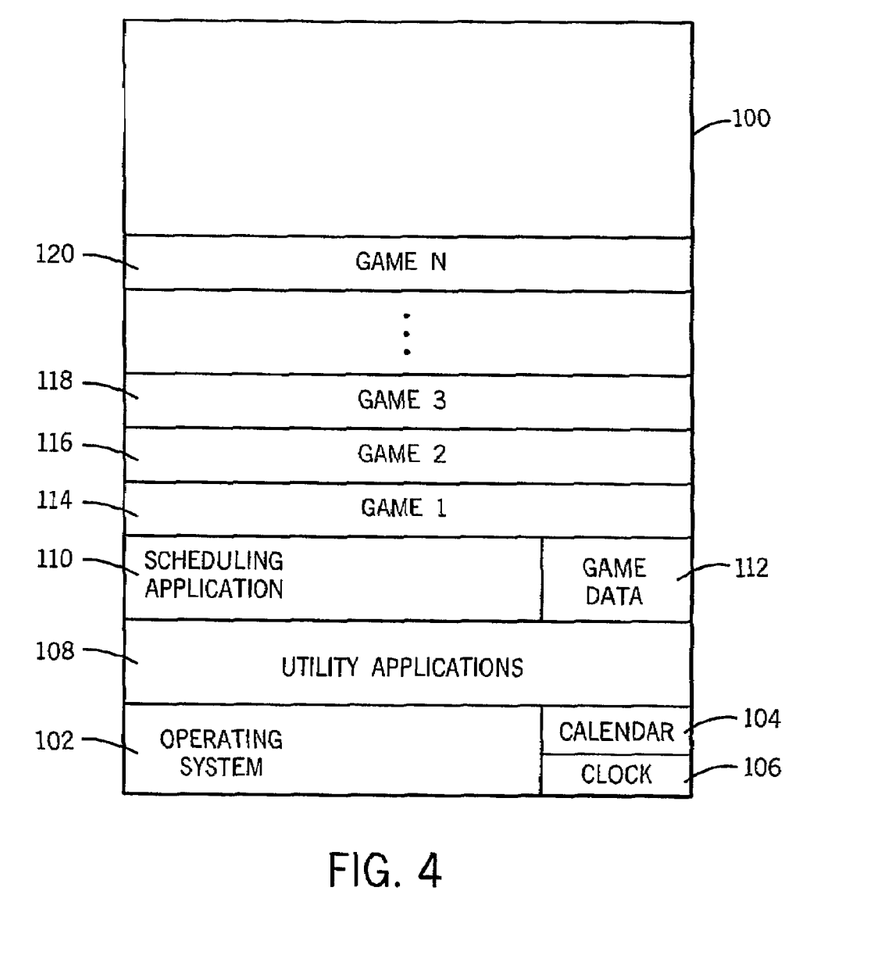
FIG. 4 is a functional diagram of an illustrative gaming machine as shown in FIG. 1.

FIG. 4 shows an illustrative functional diagram of a gaming machine 100. The gaming machine illustrated in FIG. 4 is controlled by a microprocessing unit such as described in FIG. 3 that operates under stored program instructions. An operating system 102 that preferably includes a calendar function 104 and clock function 106 controls the interaction and functionality of operation among modules of the microprocessing unit. Utility applications 108 provide additional functionality and capabilities for the gaming machine such as passing information among applications and bidirectional communications with external devices, e.g. a server or router.

A scheduling application 110 monitors date and time, and contains one or more schedules that control the game and its characteristics to be run on the gaming machine 100. A "schedule" refers to predetermined games and associated game functions that change at defined times, days, or dates. This accommodates changes per day of week, holidays, and special events associated with the casino such as superbowl party, concert, boxing match, etc. Each of the schedules contained in the scheduling application includes game data 112 that determines controllable characteristics of the associated game, e.g. minimum/maximum wagering limit. In accordance with one embodiment of the present invention, the scheduling application 110 includes a first schedule of games to be run on the gaming machine where the first schedule and the games controlled by the first schedule are downloaded from a central server. Additionally, a backup schedule and corresponding games to be run on the gaming machine are also stored in memory of the gaming machine. The utilization of the backup schedule is explained below with regard to FIG. 5.

Game programs 114, 116, 118 and 120 are stored in memory of the gaming machine 100 for use in accordance with one or more schedules stored as part of the scheduling application 110. Each of the game programs may represent a different wagering game suitable for play on the physical gaming machine.

Figure 5:
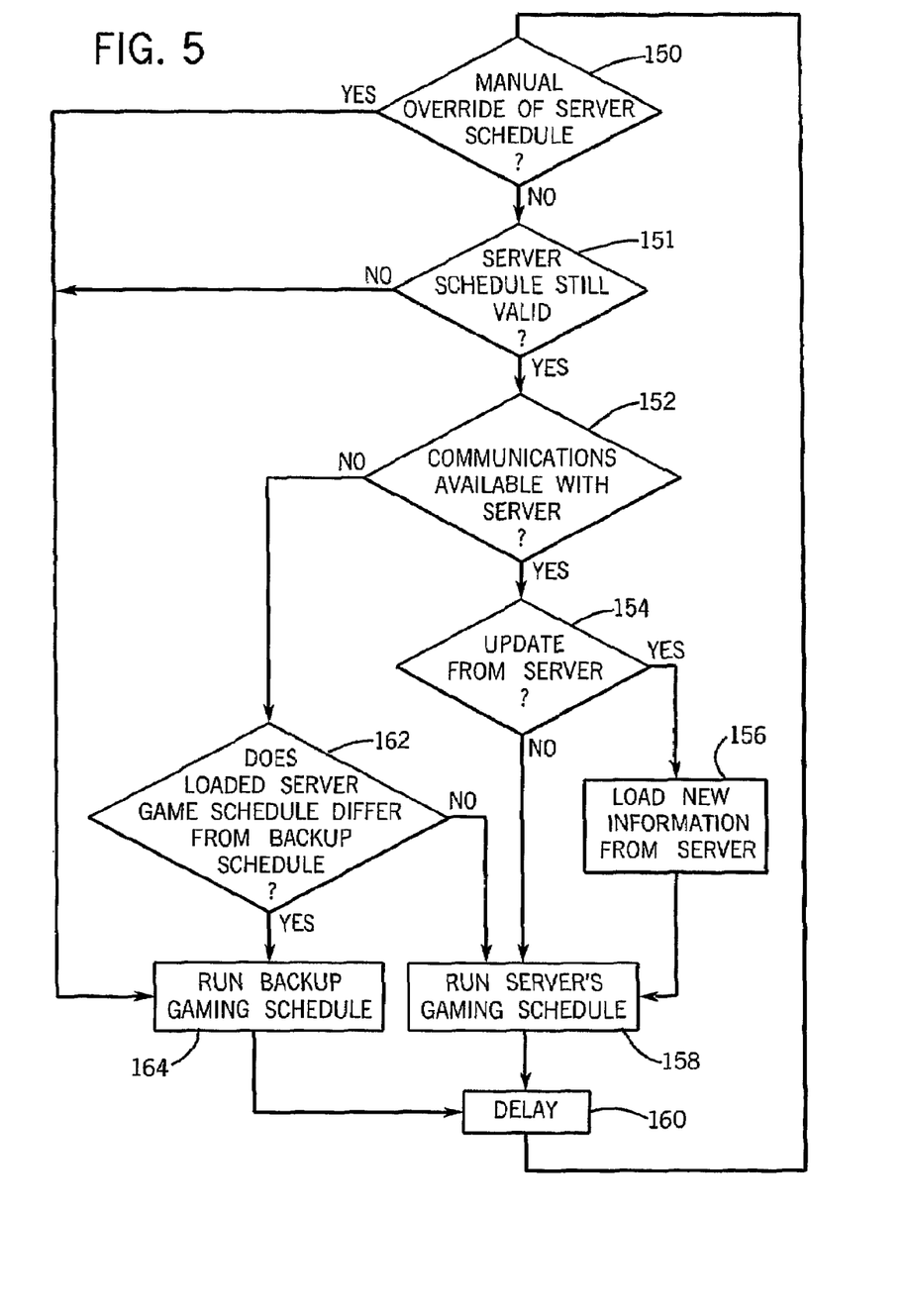
FIG. 5 is a flow diagram of an illustrative method for controlling a gaming machine in accordance with the present invention.

FIG. 5 shows an illustrative method for updating and controlling a gaming machine in accordance with present invention. In step 150 a determination is made of whether a manual override of a schedule downloaded from the server is in effect. An internal switch in the gaming machine may be manually controlled by an administrator to provide an override signal. Alternatively an override signal may be communicated to the gaming machine such as from local software or remote software coupled via the administration port 94. A NO determination in step 150 results in a determination in step 151 of whether the current schedule from the server is still within a valid time frame, i.e. is a time/day/date parameter downloaded with the schedule from the server still within the current time/day/date? A NO determination by step 151 results in the backup gaming schedule being run as indicated at step 164. A YES determination by step 151 results in a determination in step 152 of whether communications are available with the server, i.e. can the server and the subject gaming machine communicate with each other? A YES determination by step 152 results in a further determination in step 154 of whether an update to the gaming machine is to be made from the server. A YES determination in step 154 results in new information being loaded from the server in step 156. Such server information may include a new gaming schedule, data associated with an existing game on the gaming machine that will change the characteristics of the existing game, control instructions, or downloading a new game and/or deleting an existing game. Following step 156 or upon a NO determination by step 154, the gaming machine proceeds to implement the current server-based schedule as indicated at step 158. The delay indicated in step 160 represents a selectable time interval to delay before returning for another pass through the loop as described in FIG. 5. Depending upon the configuration of the gaming machine environment a typical delay interval could consist of less than 10 seconds or could be several minutes or hours.

A NO determination at step 152, indicating that communications are not available with the server, results in a determination in step 162 of whether the loaded game schedule from the server differs from a backup schedule held in memory in the game machine. A NO determination in step 162 indicating that the game schedule from the server does not differ from the backup schedule results in the gaming machine continuing to run the current schedule from the server at step 158. A YES determination by step 162 results in the gaming machine running the backup gaming schedule as indicated at step 164 with the process continuing to delay step 160. Alternatively, upon a NO determination by step 152 indicating that communications are not available with server, step 162 could be omitted with the backup gaming schedule of step 164 being implemented.

A YES determination by step 150 indicates that a manual override of the server's schedule has been made and results in gaming machine executing the backup gaming schedule at step 164. The intent of the manual override is to cause control of the gaming schedule being run by the gaming machine to be controlled by a backup schedule as opposed to the last schedule downloaded from the server. Upon a loss of communications with the server and a determination that the backup schedule is not the same as the last schedule downloaded from the server, the backup schedule will be automatically implemented by the gaming machine. Maintaining a backup schedule on the gaming machine allows it to operate in a desired mode in the event of a malfunction of the server or its communication link with the gaming machine.

The backup schedule can be manually loaded into the gaming machine through administration port 94. Alternatively, the backup schedule can be downloaded from the server for later use by the gaming machine should communications be lost with the server. Of course the backup schedule itself can be updated as needed.

The gaming machine 48 in one example employs one or more computer-readable signal-bearing media. The computer-readable signal-bearing media store software, firmware and/or assembly language for performing one or more portions of one or more embodiments of the invention. Examples of a computer-readable signal-bearing medium for the gaming machine 48 comprise ROM 82, RAM 84 and hard drive 86. The computer-readable signal-bearing medium for the gaming machine 48 in one example comprise one or more of a magnetic, electrical, optical, biological, and atomic data storage medium. For example, the computer-readable signal-bearing medium comprise floppy disks, magnetic tapes, CD- ROMs, DVD-ROMs, hard disk drives, and electronic memory. In another example, the computer-readable signal-bearing medium comprises a signal transmitted over a network coupled with the gaming machine 48; see FIG. 1.

The steps or operations described herein are just exemplary. There may be many variations to these steps or operations without departing from the spirit of the invention. For instance, the steps may be performed in a differing order, or steps may be added, deleted, or modified.

These embodiments and obvious variations thereof are contemplated as falling within the spirit and scope of the claimed invention, which is set forth in the following claims.

What is claimed is:

1. A computer-implemented method for controlling and modifying operations of a remotely reconfigurable gaming machine, the gaming machine comprising one or more processors, at least one resident memory device, and a communications component configured for unidirectional or bidirectional communications with a server, the method comprising:
    configuring, via the one or more processors, the gaming machine according to a first schedule comprising predetermined first games and associated first game functions that change at various defined times;
    storing a second schedule for the gaming machine on the at least one resident memory device, the second schedule comprising predetermined second games and associated second game functions;
    in response to the communications between the gaming machine and the server being available via the communications component, providing, from the server via the communications component, a schedule update of the first schedule;
    in response to the communications not being available, accessing, via the one or more processors, the second schedule stored on the at least one resident memory device and configuring, via the one or more processors, the gaming machine according to the second schedule; and
    in response to a manual override condition being provided to the gaming machine, configuring, via the one or more processors, the gaming machine according to the second schedule stored on the at least one resident memory device.

2. The method of claim 1, wherein the at least one resident memory device is accessed by the one or more processors via an internal connection that bypasses the communications component.

3. The method of claim 1, wherein a manually operable switch disposed inside the gaming machine provides the manual override condition.

4. The method of claim 1, wherein the manual override condition is provided by the server.

5. The method of claim 1, wherein the second schedule is stored on the at least one resident memory devices via connecting to a physical port on the gaming machine.

6. The method of claim 1, wherein the gaming machine initiates the communications with the server.

7. The method of claim 1, wherein the server initiates the communications with the gaming machine.

8. The method of claim 1, further comprising, in response to the communications being available, downloading the schedule update to the gaming machine and configuring, via the one or more processors, the gaming machine according to the schedule update.

9. The method of claim 1, wherein the first schedule has a predetermined valid time period, and an availability of the communications is checked prior to an end of the valid time period.

10. The method of claim 9, wherein the availability of the communications is checked periodically.

11. The method of claim 9, wherein the availability of the communications is checked continuously.

12. A computer-readable, non-transitory medium in a gaming system, the gaming system including a server and at least one gaming machine, the at least one gaming machine comprising at least one resident memory device and a communications component configured for unidirectional or bidirectional communications with a server, the medium including instructions which, when executed by one or more processors, cause the gaming system to perform a method comprising:
    configuring, via the one or more processors, the at least one gaming machine according to a first schedule of predetermined first game and associated first game functions that change at various defined times;
    storing a second schedule for the at least one gaming machine on the at least one resident memory device, the second schedule comprising predetermined second games and associated second game functions;
    in response to communications between the at least one gaming machine and the server being available via the communications component, providing, from the server via the communications component, a schedule update of the first schedule;
    in response to the communications not being available, accessing, via the one or more processors, the second schedule stored on the at least one resident memory device and configuring, via the one or more processors, the at least one gaming machine according to the second schedule; and
    in response to a manual override condition being provided to the at least one gaming machine, configuring, via the one or more processors, the at least one gaming machine according to the second schedule stored on the at least one resident memory device.

13. The medium of claim 12, wherein the one or more processors are operably connected to the at least one gaming machine and the server via a communications network.

14. The medium of claim 13, wherein the one or more processors initiate the communications between the at least one gaming machine and the server.

15. The medium of claim 12, wherein the first schedule has a predetermined valid time period, and an availability of the communications is checked prior to the end of the valid time period.

16. The medium of claim 12, wherein the medium resides in the gaming machine and the instructions include the second schedule.

17. The medium of claim 12, wherein the one or more processors include at least one gaming machine processor resident in the at least one gaming machine, the instructions being executed by the at least one gaming machine processor.

18. The medium of claim 17, wherein the at least one resident memory device is accessed by the at least one gaming machine processor via an internal connection that bypasses the communications component of the at least one gaming machine.

19. The medium of claim 12, wherein the one or more processors, in response to the communications not being available, further cause the at least one gaming machine to select a delay interval after which communications between the at least one gaming machine and the server are re-tested at least once after the delay interval.

20. A gaming system operable to control and modify operations of one or more remotely configurable gaming machines, each of the one or more gaming machines comprising at least one resident secondary memory device and a communications component configured for unidirectional or bidirectional communications with a server, the system comprising:
- one or more processors;
- one or more primary memory devices that store a plurality of instructions which, when executed by the one or more processors, cause the one or more processors to operate with the one or more gaming machines to:
- configure each of the one or more gaming machines according to a respective first schedule comprising predetermined first game and associated first game functions that change at various defined times;
- store a respective second schedule for each of the one or more gaming machines on the at least one resident secondary memory device of each of the one or more gaming machines, the respective second schedule comprising predetermined second games and associated second game functions;
- in response to the communications between any of the one or more gaming machines and the server being available via the communications components of each of the one or more gaming machines, providing a schedule update of the respective first schedule to each of the one or more gaming machines having communications;
- in response to the communications between any of the one or more gaming machines and the server not being available, accessing, via the one or more processors, the respective second schedule stored in the at least one resident secondary memory device of each of the one or more gaming machines not having communications and configuring, via the one or more processors, each of the one or more gaming machines not having communications according to the respective second schedule stored on the at least one resident secondary memory device of each of the one or more gaming machines not having communications; and
- in response to a manual override condition being provided to any of the one or more gaming machines, configuring, via one or more processors, the any of the one or more gaming machines according to the respective second schedule stored on the at least one resident secondary memory device of the any of the one or more gaming machines.

21. The system of claim 20, wherein the at least one resident memory device of each gaming machine is accessed by the one or more processors via an internal connection that bypasses the communications component of each gaming machine.

22. The system of claim 20, wherein a manually operable switch disposed inside the any one of the one or more gaming machines causes the manual override condition.

23. The system of claim 20, wherein the manual override condition is provided by the server.

24. The system of claim 20, wherein providing a schedule update includes downloading the schedule update to the gaming machines having communications and configuring the gaming machines having communications according to the downloaded schedule update.

25. The system of claim 20, wherein at least one respective first schedule has a predetermined valid time period, and an availability of the communications is checked prior to the end of the valid time period.

26. The system of claim 25, wherein the availability of the communications is checked periodically.

27. The system of claim 25, wherein the availability of the communications is checked continuously.

* * * * *

UNITED STATES PATENT AND TRADEMARK OFFICE
CERTIFICATE OF CORRECTION

PATENT NO.        : 8,142,291 B2
APPLICATION NO.   : 12/445036
DATED             : March 27, 2012
INVENTOR(S)       : Chad A. Ryan It is certified that error appears in the above-identified patent and that said Letters Patent is hereby corrected as shown below:

- Claim 12, Column 8, Line 20
  Change "first game and associated first game functions" to "first games and associated first game functions"
- Claim 20, Column 9, Line 16
  Change "first game and associated first game" to "first games and associated first game"

Signed and Sealed this
Thirty-first Day of July, 2012

David J. Kappos
*Director of the United States Patent and Trademark Office*